M. M. MONIE.
MUD GUARD OF MOTOR CYCLES, MOTOR CARS, AND THE LIKE.
APPLICATION FILED SEPT. 30, 1918.
1,293,861.
Patented Feb. 11, 1919.
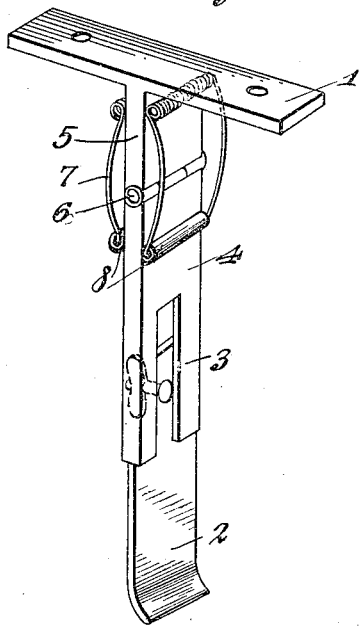
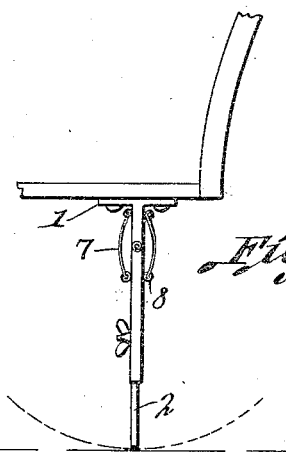
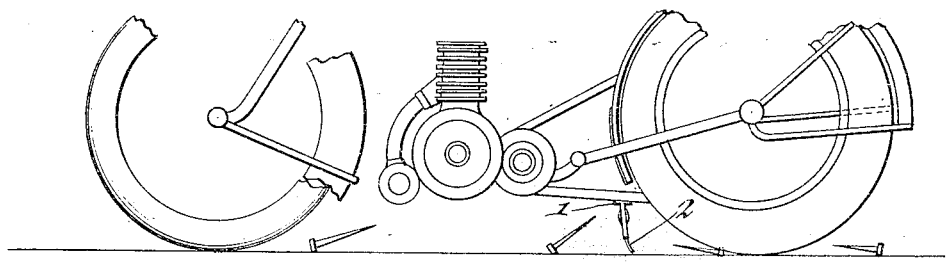
Inventor:
Matthew Morton Monie,
By: B. Singer, Atty.

UNITED STATES PATENT OFFICE.

MATTHEW MORTON MONIE, OF GLASGOW, SCOTLAND.

MUD-GUARD OF MOTOR-CYCLES, MOTOR-CARS, AND THE LIKE.

1,293,861.　　　　　Specification of Letters Patent.　　Patented Feb. 11, 1919.

Application filed September 30, 1918. Serial No. 256,341.

*To all whom it may concern:*

Be it known that I, MATTHEW MORTON MONIE, M. A., B. Sc., of 6 Garrioch Drive, Maryhill, Glasgow, Scotland, soil geologist, have invented certain new and useful Improvements in or relating to the Mud-Guards of Motor-Cycles, Motor-Cars, and the like, of which the following is a specification.

My invention has for its object to provide a simple, cheap and efficient means of preventing nail puncturing of tires of motor cycles, motor cars and the like, when the same come into contact with a nail or such like temporarily erected from its customary prone position by the forward acting pressure of the front tire. The invention is essentially a vibrating nail or similar metal object tripper and is differentiated from road sweepers and fenders which are unsuitable for the purpose of the present invention, as they will not effect the object aimed at.

In carrying out my invention, I provide a flap of rubber, or a combination of rubber and canvas, or other weather proof material and of any convenient shape. This flap is bolted or otherwise suitably fixed to the anterior end of the rear mudguard, running-board, frame member or axle and lies in a position exactly in line between the front and the rear wheels and just clears the road. Suitable springs are or may be provided in conjunction with the flap to give a stiffening effect to the same and increase its resiliency and power. The action is as follows:—

It is known from my own experience as well as that of others, that 80 to 90% of the punctures which occur affect the rear tire or tires and are caused by objects which usually lie flat upon the road and are incapable of standing on end unless for an instant. The front wheel causes these to stand on end, placing them in such a position as to puncture the back tire. The flap which covers the advance of the rear tire and which vibrates rapidly when the machine is running turns the nail to an angle unsuitable for tire penetration, thereby allowing the rear tire to run over the nail in safety.

In place of having the flap of rubber, or the combination of rubber and canvas or other material as described, I may, for cheapness or efficiency form the upper part thereof of a flat steel spring of similar shape to the rubber—which is, or may be, covered over with a thin coating of rubber or canvas—and the lower part of rubber or such like material suitably connected to the upper part.

A roller or rollers or such like is or are, or may be, provided at the foot of the flap to lengthen the life of same and increase efficiency.

My experience in riding a motor cycle shows:—

Without my invention with 11,000 miles, I had 47 punctures.

With my invention with 10,500 miles and road trials riding over 25,000 nails I had no punctures.

From the foregoing results the great advantages of my appliance will be quite obvious.

In order that my invention may be properly understood and readily carried into effect, I have hereunto appended three sheets of drawings, of which—

Figure 1 shows my preferred form of guard.

Fig. 2 illustrates the method of application to an automobile.

Fig. 3 shows the operation and suspension of my guard from a motorcycle.

In these views 1 represents the support from which the guard is suspended and 2 the guard proper, which is connected to the support by means of an adjusting member 3, a body portion 4 and a stud portion 5, a hinge 6 being interposed between such two latter portions.

It will be noted that a spring 7 is mounted upon each side of the stud 5 and that the ends thereof are provided with rollers or bearing members 8 which engage the body portion 4 on its two faces, thus permitting of a swinging motion of the guard 2.

It will be seen in operation, reference being had particularly to Fig. 3, that upon the objects in the road becoming up-ended by the front wheel they will be struck by the guard 2, thus assuming a flat position whereby the rear wheels of the vehicle may pass over them without injury to the tire.

Having described my invention, what I desire to claim is:—

1. A guard for vehicle wheels adapted to be located in front of the rear wheels of vehicles including a stud fixed to the vehicle, a flap positioned below the stud, a hinge for connecting the stud and flap together and means acting upon both faces of the flap for holding the same normally in a vertical position.

2. A guard for vehicle wheels adapted to be located in front of the rear wheels of vehicles including a stud secured to the vehicle, a flap positioned below such stud, a hinge interposed between such flap and stud being adapted to connect the two together, and a pair of springs positioned one on each side of the stud, the free ends of the springs being adapted to act upon both faces of said flap whereby to hold the same normally in a vertical position.

3. A guard for vehicle wheels adapted to be located in front of the rear wheels of the vehicle including a stud secured to the vehicle, a flap positioned below such stud, a hinge interposed between such flap and stud being adapted to connect the two together, a pair of springs positioned one on each side of the stud, the free ends of the springs being adapted to act upon the two faces of the flap respectively, and rollers secured to the ends of such springs for insuring easy moving engagement between the flap and ends of the springs.

In testimony whereof I affix my signature in presence of two witnesses.

MATTHEW MORTON MONIE.

Witnesses:
  JOHN LIDDLE,
  JOHN TRAIN LIDDLE.

Copies of this patent may be obtained for five cents each, by addressing the "Commissioner of Patents, Washington, D. C."